United States Patent

[11] 3,621,084

[72] Inventor Lawrence F. Humphrey
 Yonkers, N.Y.
[21] Appl. No. 740,902
[22] Filed June 28, 1968
[45] Patented Nov. 16, 1971
[73] Assignee Stauffer Chemical Company
 New York, N.Y.

[54] PROCESS OF PRODUCING TRIALKYL PHOSPHITES
 5 Claims, 1 Drawing Fig.
[52] U.S. Cl. .................................................. 260/976
[51] Int. Cl. .................................................. C07f 9/08
[50] Field of Search .................................... 260/976

[56] References Cited
 UNITED STATES PATENTS
3,057,904 10/1962 Reetz et al. .................... 260/976
3,068,267 12/1962 Beck et al. ..................... 260/976

Primary Examiner—Charles B. Parker
Assistant Examiner—D. R. Phillips
Attorneys—Daniel C. Block, Robert C. Sullivan, Donald M. MacKay, Paul J. Juettner, Wayne C. Jaeschke and Daniel S. Artiz ABSTRACT: A process of producing trialkyl phosphites by reacting phosphorus trichloride with an alcohol in an inert solvent wherein a tertiary amine is added as a hydrogen chloride acceptor along with anhydrous ammonia. The improvement comprises the steps of maintaining the pH at between 6 and 8 and a temperature between 40° and 80° C. for reacting a phosphorus trichloride with the alcohol. Moreover, the anhydrous ammonia is added after the initial reaction between the phosphorus trichloride and the alcohol so as to not interfere therewith.

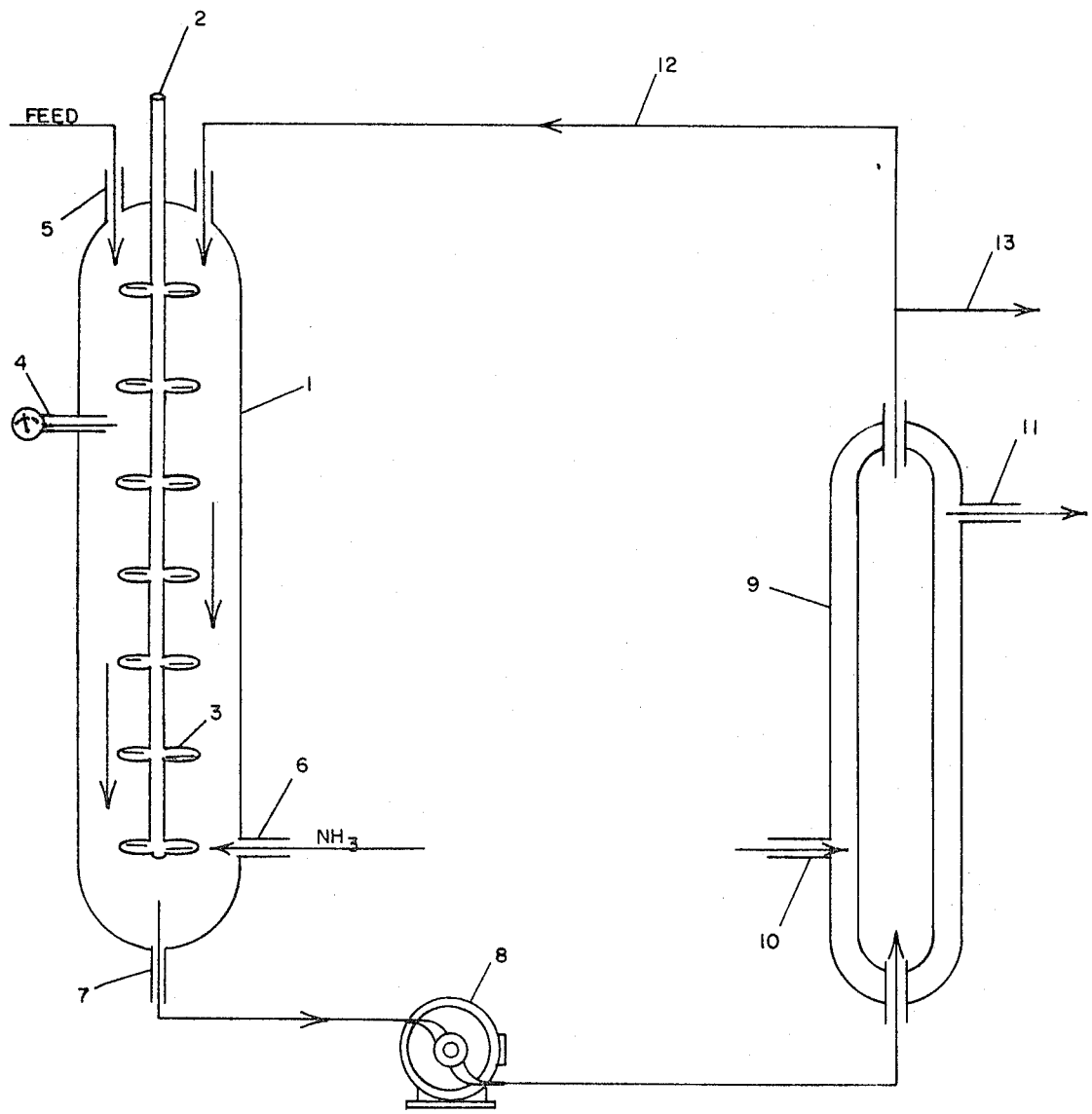

3,621,084

PROCESS OF PRODUCING TRIALKYL PHOSPHITES

BACKGROUND OF THE INVENTION

The reaction of phosphorus trichloride and an alcohol in the presence of a tertiary amine to produce a trialkyl phosphite is well known in the art, see for instance Kosolapoff, Organo-Phosphorus Compounds, page 184 (John Wiley and Sons, (1958). There are certain disadvantages to this process, however, particularly with the lower alkyl phosphites such as trimethyl phosphite where the amount of amine hydrochloride is large compared with the amount of the product formed due to the high molecular weight of the tertiary amine hydrochloride. There is also a difficult separation problem under these circumstances with a relatively small amount of liquid product and a large amount of solid byproducts.

Numerous attempts have been made to improve upon this basic process, as illustrated in U.S. Pat Nos. 2,843,616; 2,848,474; 2,859,238; 2,863,905 and 2,678,940. In general, these patents illustrate the reaction between the components by halting the attacks of the hydrogen chloride upon the trialkyl phosphite. First and foremost, has been an attempt to keep the reaction mixture on the alkaline side or at a pH above 7.0. This has been done by adding extensive tertiary amines as hydrogen chloride acceptors or even adding ammonia directly to the charge to react with the hydrogen chloride directly. This latter process has the disadvantage of requiring extremely careful and constant process control since slight excess ammonia will react with the phosphorus trichloride to reduce yields by forming amidophosphites whereas slight deficiency of ammonia will allow deleterious hydrochloride attacks of the alkyl phosphite as discussed above.

More recently, it has been proposed to produce a trialkyl phosphites by reacting phosphorus trichloride and alcohol at pH's as low as 2.5 with good process control and excellent yields. This is brought about by adding less than a stoichiometric amount of certain tertiary amines to the alcohol in an inert solvent and then while adding PCl$_3$ continuously anhydrous ammonia is added. Thus, the hydrogen chloride first reacts with the tertiary amine to form an amine hydrochloride. This latter compound is then continuously reacted with ammonia to regenerate the amine. By this means there is a continuous supply of tertiary amine present to react with the hydrogen chloride involved, yet the cost of using stoichiometric amounts of the amine as in the prior art is avoided. Likewise, there is always amine hydrochloride present to react with ammonia so the prior art difficulty of forming amido phosphites is avoided. This procedure is outlined and discussed in U.S. Pat. No. 3,068,267.

However, all the above processes lack the critical reaction conditions in order to provide yields of above 80 percent

BRIEF DESCRIPTION OF THE INVENTION

It has been discovered that trialkyl phosphites can be made in yields above 80 percent by critically controlling the temperature of reaction, the pH of the reaction medium at the feed of the component for reaction, and the position of injecting the anhydrous ammonia within the reaction medium. Thus, by controlling the reaction temperature of between 40° and 80° C. and the pH of the reaction medium between 6 and 8 and allowing the phosphorus trichloride and alcohol to react together a sufficient length of time to provide initial reaction and then adding anhydrous ammonia, high yields are obtained.

BRIEF DESCRIPTION OF THE DRAWINGS

FIG. 1 is a schematic illustration of the process embodying the present invention.

DETAILED DESCRIPTION OF THE INVENTION

In practicing the present invention, a reactor chamber 1 provided with an agitator 2 having agitator blades 3 attached thereto is charged with phosphorus trichloride and an alcohol in the presence of an inert solvent with a tertiary amine as the hydrogen chloride acceptor. These materials are charged into the reaction vessel 1 and 5 The temperature of the reaction vessel is maintained between 40° and 80° C. Also, the pH of the reaction medium is maintained at between 6 and 8 at the discharge of the infeed materials. This pH is measured by pH indicator 4. As is well known in the art, the alcohol and phosphorus trichloride react together to provide the trialkyl phosphites. As hydrogen chloride is evolved, the tertiary amines react therewith to form the amine hydrochloride. The reaction medium is then pumped from reaction chamber 1 to a cooling chamber 9 via line 7 and pump 8. As the reaction medium flows down the vessel 1, anhydrous ammonia is added at essentially the discharge end of the reaction chamber as indicated at 6. The function of the anhydrous ammonia is to regenerate the amine that is initially added. The cooling chamber 9 is provided with the usual inlet 10 and exits 11 for circulating a coolant therein. The reaction materials are discharged into line 12 and recycled back to the reaction chamber 1. In actual operation, the product is removed at 13 with the mother liquor being recycled via line 12.

It is essential to the practice of the present invention that the temperature within the reaction chamber 1 be maintained at between 40° and 80° C., preferably up to about 60° C. Moreover, it is essential that the pH at the discharge of the infeed be maintained at between 6 and 8, along with the addition of the anhydrous ammonia at the discharge end of the reaction chamber. Thus, with a suitable flow rate provided within the recycling system, high yields of trialkyl phosphites can be produced without side reactions as is well known in the art.

Suitable tertiary amines would include pyridine, $\alpha$picoline, quinoline, dimethyl aniline, and diethylaniline. The alcohol is selected for reaction with the phosphorus trichloride to provide the end product desirable. Among the alcohols are the lower aliphatic alcohols such as methyl alcohol, ethyl alcohol, butyl alcohol and the like. The amount of tertiary amine used may range between 1 and 20 percent of that stoichiometric quantity necessary for acid acceptance.

By providing a recycling system as indicated above, the mother liquor is continuously replenished with the reacting components of phosphorus trichloride and a alcohol as necessary to provide optimum production. By employing this recycling system, yields well above 80 percent are achieved.

The following examples illustrate the process of this invention.

EXAMPLE

A 1-liter jacketed pipe reactor equipped with a high speed stirrer, thermometer and pH probe was charged with 1,100 grams of a trimethyl phosphite reaction mixture. To this was continuously added 16.1 gm./min. of phosphorus trichloride and 11.2 gm./min of methyl alcohol. These reactants were metered from calibrated dropping funnels and were fed into the reaction mix through submerged tubes at a point near the top agitator blade. Simultaneously, 38.9 gm./min. of petroleum solvent and 1.52 gm./min. of dimethyl aniline were added to the mix from feed reservoirs. The pH of the reaction mix was controlled between 6.0 and 8.0 by feeding 5.9 gm./min. of gaseous ammonia into the reactor at a point about 10 inches below the reactant feed point. The reaction mixture was pumped through an external heat exhanger. The reaction temperature was maintained at 47° C. by circulating cold water in the reactor jacket and the shell side of the heat exchanger. A small amount of the recycle stream was removed to maintain a constant level in the reactor. After allowing a reasonable time to reach equilibrium, a sample of the decanted liquor from the reaction mixture as analyzed to be a trimethyl phosphite yield of 90 percent.

Example II

In the same apparatus, as described in example I, was charged 1,100 grams of triethyl phosphite reaction slurry. To this was continuously added 17.8 grams of phosphorus trichloride and 19.6 grams of ethyl alcohol. Simultaneously 51.9 grams of petroleum solvent and 0.84 gm./min. of diethyl aniline were fed to the reaction mix. The pH of the reaction slurry was controlled between 6 and 8 by feeding ammonia at a rate of 8.4 gm./min. The reaction temperature was maintained at 49° C. After the system was equilibrated, a sample of the decanted liquor from the reaction mixture was analyzed to be 92.5 percent yield of triethyl phosphite.

EXAMPLE III

An 8-gallon jacketed reactor equipped with a high-speed turbine agitator, thermocouples and pH probe was charged with sufficient trimethyl phosphite reaction mixture to cover the agitator blades. To this was continuously added 191.0 gm./min. of phosphorus trichloride and 129.5 gm./min. of methanol. These reactant were metered into the reaction through dip tubes extending several inches below the surface of the reaction slurry. Simultaneously 390 gm./min. of petroleum solvent and 14.0 gm./min. of diethyl aniline were fed through flowmeters into the reactor. The pH of the reaction mix was controlled between 6 and 8 by metering 72.0 gm./min. of gaseous ammonia into the bottom of the reactor at a point 10 inches from the reactants feed point. The heat of the reaction was removed and the reaction temperature maintained at 54° C. by circulation of cold water on the reaction jacket and pumping the reaction mixture through a water cooled heat exchanger. A small part of the recycle stream was continually removed to maintain a constant level in the reactor. After operating for a time sufficient to reach equilibrium, a sample of the filtered reaction mixture was analyzed to be a trimethyl phosphite yield of 91.4 percent.

EXAMPLE IV

In apparatus similar to that in example III was charged sufficient triethyl phosphite reaction slurry to cover the agitator blades. To this was continually fed 188 gm./min. of phosphorus trichloride and 187.5 gm./min. of ethyl alcohol. Simultaneously 480 gm./min. of petroleum solvent and 14.0 gm./min. of diethyl aniline were fed to the reaction mixture. The pH of this slurry was kept between 6 and 8 by ammonia at a rate of 77.2 gm./min. The reaction temperature was maintained at 58° C. After the system was equilibrated, a sample of the filtered reaction mix analyzed to be a triethyl phosphite yield of 93 percent.

What is claimed is:

1. In the process of producing trialkyl phosphites by reacting phosphorus trichloride with a lower aliphatic alcohol in an inert solvent using a tertiary amine as a hydrogen chloride acceptor and anhydrous ammonia to regenerate the tertiary amines, the improvement which comprises maintaining the temperature within the reaction medium between 40° and 80° C., maintaining the pH of the reaction medium between 6 and 8 at the feed of the reactants into the reaction medium and adding the anhydrous ammonia to the reaction medium after the initial reaction between the phosphorus trichloride and alcohol.

2. The process as set forth in claim 1, wherein the reaction between the phosphorus trichloride and alcohol is in a continuous recycling system.

3. The process of claim 1 wherein the tertiary amine is dimethyl aniline.

4. The process as set forth in claim 1 wherein said tertiary amine is pyridine.

5. The process as set forth in claim 1 wherein said tertiary amine is diethyl aniline.

* * * * *